2,787,640
Patented Apr. 2, 1957

2,787,640

N-TERT-OCTYL GLYCINE

James S. Strong, Oreland, Pa., assignor to Rohm & Haas Company, Philadelphia, Pa., a corporation of Delaware No Drawing. Application June 4, 1954,
Serial No. 434,660

1 Claim. (Cl. 260—534)

This invention deals with N-tert-octyl glycine and with a method for its preparation.

Previously known aminoacetic acids lack the present octyl group which is bound to the nitrogen of the acid at a tertiary carbon atom and which possesses a highly branched structure. These are factors which control the properties of this compound and confer the utility of serving to decrease the viscosity of plastisols to which it is added. This action of N-tert-octyl glycine is in strange contrast with that of n-octyl glycine, which increases the viscosity of plastisols.

A convenient method for the preparation of N-tert-octyl glycine is based upon reacting the trialkylcarbinylamine

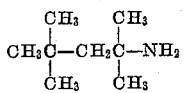

with formaldehyde and hydrogen cyanide to form the nitrile tert-$C_8H_{17}$HN$CH_2$CN hydrolyzing this nitrile with aqueous alkali metal hydroxide solution, and converting the resulting salt to the acid form.

Reaction of amine with formaldehyde and hydrogen cyanide may be carried out in aqueous solution or in a mixture of water and a water-soluble alkanol. Temperatures between 0° and 50° C. are used.

The order of mixing amine, formaldehyde, and hydrogen cyanide is not important. All three reactants may be brought together or any two may be combined and the third added, even though reaction may have occurred between the first two. For example, amine and formaldehyde may be first reacted and hydrogen cyanide added thereto. Again, formaldehyde and hydrogen cyanide may be reacted to form glycolonitrile, which is then reacted with the amine. Of course, other methods of forming glycolonitrile may be used, as is known. Use of glycolonitrile is very convenient.

Formaldehyde may be used as an aqueous solution containing 30% to 50% of formaldehyde or as a revertible polymer. The hydrogen cyanide may be supplied as a liquid or a gas.

The N-cyanomethyl-N-tert-octylamine formed in this first stage of reaction may desirably be separated. It is then heated in an aqueous strongly alkaline solution with evolution of ammonia. There results the alkali metal salt

For some purposes the reaction need be carried no further. The salt can be recovered by evaporating the solution and crystallizing it.

The salt is readily converted to the acid form by treating it with a solution of a strong inorganic acid to a pH below 7. By addition of a water-soluble alcohol alkali metal salt is precipitated and the free glycine taken up.

A detailed description of N-tert-octyl glycine is presented in the following illustrative example where in parts are by weight.

Example (a) To a mixture of 455 parts of 2-amino-2,4,4-trimethylpentane, 350 parts of water, and 300 parts of ethanol an aqueous 37% formaldehyde solution was rapidly added at 15°–25° C. to a total of 288 parts. This addition required 20 minutes and during this time the reaction mixture was cooled to maintain the desired temperature level. There was then added 94.5 parts of anhydrous hydrogen cyanide over a period of 20 minutes, while the temperature was maintained at 15°–25° C. The mixture was then stirred for two hours at 25°–35° C. and allowed to form layers. The upper oil layer was taken and distilled to yield 552 parts of 2,4,4-trimethyl-2-pentylaminoacetonitrile, distilling at 116°–124° C./15 mm.

(b) To a solution of 385 parts of the above nitrile in 650 parts of ethanol at 45° C. there was added a solution of 91.6 parts of sodium hydroxide in 800 parts of water. This mixture was heated under reflux for nine hours with evolution of ammonia. Alcohol was stripped from the solution and the solution was cooled. The sodium salt of the acid formed crystallized and amounted to 345 parts.

A portion of 260 parts of this salt and 900 parts of water were mixed and treated with sulfuric acid until the pH of the solution was 6.5. The solution was evaporated to dryness. The residue was treated three times with hot ethanol, the mixture each time being cooled and filtered to remove sodium sulfate. There was thus obtained a solution of tert-octyl glycine. The alcohol was evaporated therefrom to give the product, as a solid, which corresponded in composition to $C_8H_{17}$NH$CH_2$COOH in which the $C_8H_{17}$ group is 2,4,4-trimethyl-2-pentyl.

A plastisol was prepared by dispersing powdered polyvinyl chloride in an equal weight of dioctyl phthalate. One portion of this plastisol was kept as a control. Another portion was treated with the above tert-octyl glycine in an amount of 1% of the weight of the portion. This treated portion had but 43% of the viscosity of the control portion. The two portions were stored for 43 days and were again examined. The treated portion had but 34% of the viscosity of the control portion at this time.

Another portion of the above plastisol was treated with n-octyl glycine at 1% of the weight of this portion. The viscosity of the thus treated portion was greater than that of the control.

The n-octyl glycine was prepared by reacting n-octylamine, formaldehyde, and hydrogen cyanide to form n-octylaminoacetonitrile, distilling at 140–150° C./7 mm. There were mixed 64.5 parts of n-octylaminoacetonitrile and 44 parts of an aqueous 40% sodium hydroxide solution. This mixture was stirred and heated under reflux for six hours. The reaction mixture was treated with 200 parts of methanol and sufficient 50% sulfuric acid to bring the pH of the resulting mixture to 6.5. The sodium sulfate which formed was filtered off from the hot mixture. The filtrate was stripped to yield a semi-solid mass. This was triturated with acetone. There was thus obtained a crystalline solid in an amount of 28 parts. It was essentially free of ash and corresponded closely in composition to that of n-octyl glycine.

I claim:

As a new chemical compound, N-tert-octyl glycine.

References Cited in the file of this patent

UNITED STATES PATENTS 2,394,306    Hentrich _____ Feb. 5, 1946